US010273359B2

(12) United States Patent
Ogawa et al.

(10) Patent No.: US 10,273,359 B2
(45) Date of Patent: Apr. 30, 2019

(54) POLYAMIDE RESIN COMPOSITION

(75) Inventors: Shun Ogawa, Kanagawa (JP);
Hisayuki Kuwahara, Kanagawa (JP);
Shinichi Ayuba, Kanagawa (JP);
Takahiko Sumino, Kanagawa (JP);
Kentaro Ishii, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 299 days.

(21) Appl. No.: 13/395,535

(22) PCT Filed: Sep. 14, 2010

(86) PCT No.: PCT/JP2010/065878
§ 371 (c)(1),
(2), (4) Date: Mar. 12, 2012

(87) PCT Pub. No.: WO2011/030910
PCT Pub. Date: Mar. 17, 2011

(65) Prior Publication Data
US 2012/0177937 A1 Jul. 12, 2012

(30) Foreign Application Priority Data

Sep. 14, 2009 (JP) ................ 2009-211829
Sep. 14, 2009 (JP) ................ 2009-211830
Sep. 14, 2009 (JP) ................ 2009-211838

(51) Int. Cl.
*C08L 77/06* (2006.01)
*C08G 69/26* (2006.01)
(52) U.S. Cl.
CPC .............. *C08L 77/06* (2013.01); *C08G 69/26* (2013.01); *C08G 69/265* (2013.01); *Y10T 428/31681* (2015.04)
(58) Field of Classification Search
CPC ....... C08L 77/06; C08L 77/08; C08G 69/265; C08G 69/26; Y10T 428/31681
USPC ............................ 428/458, 411.1; 524/414
See application file for complete search history.

(56) References Cited

U.S. PATENT DOCUMENTS

| | | | |
|---|---|---|---|
| 2,130,947 A | 9/1938 | Carothers | |
| 5,256,718 A | 10/1993 | Yamamoto et al. | |
| 6,291,633 B1 | 9/2001 | Nakamura | |
| 6,319,162 B1* | 11/2001 | Mizutani et al. | 474/42 |
| 6,359,055 B1 | 3/2002 | Delannoy et al. | |
| 6,476,116 B1* | 11/2002 | Egami et al. | 524/495 |
| 2004/0049006 A1* | 3/2004 | Aramaki et al. | 528/335 |
| 2008/0039568 A1* | 2/2008 | Maruyama et al. | 524/414 |
| 2008/0262193 A1 | 10/2008 | Kurose et al. | |
| 2009/0280311 A1 | 11/2009 | Kumazawa et al. | |
| 2010/0063191 A1 | 3/2010 | Hirono | |
| 2010/0120961 A1* | 5/2010 | Tanaka et al. | 524/414 |
| 2011/0224370 A1 | 9/2011 | Kanda et al. | |
| 2011/0245454 A1 | 10/2011 | Kuwahara et al. | |
| 2012/0065303 A1 | 3/2012 | Ogawa et al. | |
| 2012/0065327 A1 | 3/2012 | Ogawa et al. | |

FOREIGN PATENT DOCUMENTS

| | | | |
|---|---|---|---|
| CN | 1898331 A | | 1/2007 |
| CN | 101432364 A | | 5/2009 |
| EP | 0 172 259 A2 | | 2/1986 |
| EP | 0 172 259 A3 | | 2/1986 |
| EP | 2 025 718 A1 | | 2/2009 |
| GB | 1084521 A | | 9/1967 |
| GB | 1129074 A | | 10/1968 |
| IN | 276590 A | | 3/2009 |
| JP | 44-20637 B | | 9/1969 |
| JP | 47 15106 | | 5/1972 |
| JP | 49 35358 | | 9/1974 |
| JP | 59-191759 A | | 10/1984 |
| JP | 5 117524 | | 5/1993 |
| JP | 5 170897 | | 7/1993 |
| JP | 6 192416 | | 7/1994 |
| JP | 09-067517 | * | 3/1997 |
| JP | 2000 204240 | | 7/2000 |
| JP | 2003-26797 | * | 1/2003 |
| JP | 2004-131544 | | 4/2004 |
| JP | 2006-45413 A | | 2/2006 |
| JP | 2007-92053 A | | 4/2007 |
| JP | 2007-291250 | | 11/2007 |
| JP | 2008 7753 | | 1/2008 |
| JP | 2008 214526 | | 9/2008 |
| JP | 2008 280535 | | 11/2008 |
| JP | 2009-35656 | | 2/2009 |

(Continued)

OTHER PUBLICATIONS

Machine translation of JP 2003-26797, retrieved Feb. 28, 2014.*
Translated abstract of JP 09-067517, retrieved Feb. 28, 2014.*
Full Translation of Otaki JP-2003-26797, retrieved Jan. 6, 2015.*
U.S. Appl. No. 13/395,541, filed Mar. 12, 2012, Ishii, et al.
U.S. Appl. No. 13/391,075, filed Feb. 17, 2012, Ishii, et al.
Extended European Search Report dated Feb. 5, 2013 in Patent Application No. 10815500.3.
International Search Report dated Dec. 7, 2010 in PCT/JP10/65878 filed Sep. 14, 2010.
Combined Chinese Office Action and Search Report dated Feb. 4, 2013 in Patent Application No. 201080040958.3 (with English translation of Categories of Cited Documents).

(Continued)

*Primary Examiner* — Michael B Nelson
(74) *Attorney, Agent, or Firm* — Oblon, McClelland, Maier & Neustadt, L.L.P.

(57) ABSTRACT

Disclosed is a polyamide resin composition, including: a polyamide (A) containing a diamine unit including 70 mol % or more of a p-xylylenediamine unit and a dicarboxylic acid unit including 70 mol % or more of a linear aliphatic dicarboxylic acid unit having 6 to 18 carbon atoms; and a filler (B), in which the polyamide (A) includes a polyamide having a phosphorus atom concentration of 50 to 1,000 ppm and a YI value of 10 or less in a color difference test in accordance with JIS-K-7105, and a content of the filler (B) is 1 to 200 parts by mass with respect to 100 parts by mass of the polyamide (A).

21 Claims, No Drawings

(56) References Cited

FOREIGN PATENT DOCUMENTS

| JP | 2009-161748 | | 7/2009 |
|----|----|----|----|
| WO | WO2006/049651 | | 5/2006 |
| WO | WO 2007/010984 | * | 1/2007 |
| WO | 2008 053911 | | 5/2008 |
| WO | WO 2009/017043 A1 | | 2/2009 |

OTHER PUBLICATIONS

Office Action dated May 19, 2015, in Japanese Patent Application No. 2011-530915.
Office Action dated May 19, 2015, in Japanese Patent Application No. 2011-530916.
Office Action dated Sep. 5, 2016 in KR 10-2012-7006607, filed Sep. 14, 2010.

* cited by examiner

POLYAMIDE RESIN COMPOSITION

TECHNICAL FIELD

The present invention relates to a polyamide resin composition, and more specifically, to a polyamide resin composition including a polyamide resin containing a p-xylylenediamine unit and a linear aliphatic dicarboxylic acid unit having 6 to 18 carbon atoms as major components and a specific amount of a filler.

BACKGROUND ART

An aliphatic polyamide typified by nylon 6 or nylon 66 has excellent properties such as heat resistance, chemical resistance, rigidity, abrasion resistance, and moldability, and hence is used for a variety of applications as an engineering plastic. However, the aliphatic polyamide is known to have problems such as heat resistance in an application such as an automotive part where the polyamide is exposed to a high temperature, and low dimensional stability due to water absorption. In particular, in recent years, demands on the heat resistance tend to increase in an electrical and electronic part application using a surface mount technology and in an automotive part application such as an electrical component part in an engine room, and it is difficult to use the conventional aliphatic polyamide. Therefore, it has been desired to develop a polyamide excellent in heat resistance, dimensional stability, and mechanical properties.

In addition, the aliphatic polyamide not only has excellent abrasion resistance but also hardly causes burning even in an unlubricated state. Further, the aliphatic polyamide generates little noises and is excellent in lightweight property and corrosion resistance as well, and hence is often used in sliding parts such as a bearing, a gear, a bush, a spacer, a roller, and a cam. On the other hand, in the case where the conventional aliphatic polyamide is used under a severe condition where high friction is continuously generated, an increased temperature due to frictional heat causes melting as well as significant abrasion, which makes it difficult to continue a steady frictional motion. Moreover, the conventional aliphatic polyamide undergoes a dimensional change due to water absorption and shows reductions in mechanical properties, and it is required to improve the problems.

In order to meet such demands, there is used, as an engineering plastic, a semi-aromatic polyamide called 6T polyamide, which has a melting point higher than that of the conventional polyamide and contains a polyamide formed of 1,6-hexanediamine and terephthalic acid as a major component (see, for example, Patent Document 1). However, the polyamide formed of 1,6-hexanediamine and terephthalic acid has a melting point of about 370° C., and hence cannot be used actually because melt molding needs to be carried out at a temperature equal to or higher than a polymer degradation temperature. Therefore, in actual use, adipic acid, isophthalic acid, ε-caprolactam, or the like is copolymerized at about 30 to 40 mol % to prepare a polyamide having a composition to achieve a melting point as low as about 280 to 320° C. which is a temperature range that enables actual use of the polyamide.

Such copolymerization of a third component or a fourth component is effective for lowering the melting point, but may lead to lowering of a crystallization rate and a final crystallization degree. As a result, not only physical properties such as rigidity, chemical resistance, and dimensional stability at a high temperature are lowered, but also productivity may be lowered due to elongation of a molding cycle. Further, the polyamide has a drawback in moldability because the viscosity is easily lowered in melt retention. In order to solve such problems, it has been proposed that the problems are improved by blending a filler such as a glass fiber, a carbon fiber, a glass powder, or a graphite powder in the polymer (see, for example, Patent Documents 2 and 3). This can solve the problems to some extent, but physical properties such as the rigidity, chemical resistance, and dimensional stability are insufficient in some cases.

As a high melting point polyamide other than the 6T polyamide, there has been proposed a semi-aromatic polyamide, which is formed of a mixture of 1,9-nonanediamine and 2-methyl-1,8-octanediamine and terephthalic acid and is called 9T polyamide (see, for example, Patent Document 4). The 9T polyamide has a higher crystallization rate, a higher final crystallization degree, and lower water absorbability compared with the 6T polyamide which is the semi-aromatic polyamide and is put to practical use. However, as is the case with the above-mentioned problems, it was impossible to solve problems such as lowered physical properties due to copolymerization and lowered melt flowability due to the aromatic dicarboxylic acid used as a major component.

CITATION LIST

Patent Literature

[Patent Document 1] JP 60-158220 A
[Patent Document 2] JP 64-11073 B
[Patent Document 3] JP 3-56576 B
[Patent Document 4] JP 7-228776 A

SUMMARY OF INVENTION

Technical Problem

A problem to be solved by the present invention is to provide a polyamide resin composition excellent in physical properties such as heat resistance, mechanical properties, low water absorbability, and dimensional stability.

Another problem to be solved by the present invention is to provide a polyamide resin composition excellent in sliding property as well as in physical properties such as heat resistance, mechanical properties, and moldability.

Solution to Problem

The inventors of the present invention have made intensive studies, and as a result, have found out that a resin composition obtained by blending a specific amount of a filler in a polyamide formed of a diamine component containing p-xylylenediamine as a major component and a dicarboxylic acid component containing a linear aliphatic dicarboxylic acid having 6 to 18 carbon atoms as a major component is excellent in physical properties such as heat resistance, low water absorbability, chemical resistance, mechanical properties, and dimensional stability. Moreover, the inventors of the present invention have made further intensive studies, and as a result, have also found out that a polyamide resin composition which includes a polyamide formed of a diamine component containing p-xylylenediamine as a major component and a dicarboxylic acid component containing a linear aliphatic dicarboxylic acid having 6 to 18 carbon atoms as a major component, a specific fibrous filler, and a specific solid lubricant can maintain satisfactory sliding property even under high-load and high-speed conditions.

The present invention relates to the following items [1] to [3].

[1] A polyamide resin composition, comprising: a polyamide (A) containing a diamine unit including 70 mol % or more of a p-xylylenediamine unit and a dicarboxylic acid unit including 70 mol % or more of a linear aliphatic dicarboxylic acid unit having 6 to 18 carbon atoms; and a filler (B), wherein the polyamide (A) comprises a polyamide having a phosphorus atom concentration of 50 to 1,000 ppm and a YI value of 10 or less in a color difference test in accordance with JIS-K-7105, and a content of the filler (B) is 1 to 200 parts by mass with respect to 100 parts by mass of the polyamide (A).

[2] A polyamide resin composition, comprising: a polyamide (A) containing a diamine unit including 70 mol % or more of a p-xylylenediamine unit and a dicarboxylic acid unit including 70 mol % or more of a linear aliphatic dicarboxylic acid unit having 6 to 18 carbon atoms; a fibrous filler (B1); and a solid lubricant (C), wherein the polyamide (A) comprises a polyamide having a phosphorus atom concentration of 50 to 1,000 ppm and a YI value of 10 or less in a color difference test in accordance with JIS-K-7105, and a content of the fibrous filler (B1) and a content of the solid lubricant (C) are 5 to 200 parts by mass and 5 to 50 parts by mass, respectively, with respect to 100 parts by mass of the polyamide (A).

[3] A molded article, comprising the polyamide resin composition according to the above-mentioned item [1] or [2].

Advantageous Effects of Invention

The polyamide resin composition for a molding material of the present invention is excellent in a variety of physical properties such as heat resistance, mechanical properties (mechanical strength, toughness, and impact resistance), low water absorbability, and moldability, and can be molded into a shape of a film, a sheet, or a tube and suitably used in a variety of industries and industrial and household products. Specifically, the resin composition can be suitably used in a variety of electronic parts and surface-mounted components required to have high heat resistance and dimensional accuracy, small and thin molded articles required to have a high crystallization rate, a high final crystallization degree, and low water absorbability, and a variety of parts used under high-temperature conditions and requested to have heat-resistant performance and rigidity, such as an automotive headlight reflector and engine room parts. Further, the polyamide resin composition of the present invention is excellent also in sliding property and hence can be suitably used in a variety of sliding components such as a bearing, a gear, a bush, a spacer, a roller, and a cam.

DESCRIPTION OF EMBODIMENTS

A polyamide resin composition of the present invention includes a polyamide (A) containing a diamine unit and a dicarboxylic acid unit and a filler (B) described below. Here, the diamine unit refers to a constituent unit derived from a raw material diamine component, and the dicarboxylic acid unit refers to a constituent unit derived from a raw material dicarboxylic acid component.

<Polyamide (A)>

The polyamide (A) contains the diamine unit including 70 mol % or more of a p-xylylenediamine unit and the dicarboxylic acid unit including 70 mol % or more of a linear aliphatic dicarboxylic acid unit having 6 to 18 carbon atoms.

The p-xylylenediamine unit in the diamine unit is contained at a concentration of preferably 80 mol % or more, more preferably 90 mol % or more, most preferably 100 mol %. The linear aliphatic dicarboxylic acid unit having 6 to 18 carbon atoms in the dicarboxylic acid unit is contained at a concentration of preferably 80 mol % or more, more preferably 90 mol % or more, most preferably 100 mol %.

The polyamide (A) can be obtained by polycondensation of a diamine component including 70 mol % or more of p-xylylenediamine and a dicarboxylic acid component including 70 mol % or more of a linear aliphatic dicarboxylic acid having 6 to 18 carbon atoms.

The diamine component as a raw material of the polyamide (A) includes p-xylylenediamine at a concentration of 70 mol % or more, preferably 80 mol % or more, more preferably 90 mol % or more, particularly preferably 100 mol %. When the concentration of the p-xylylenediamine in the diamine component is adjusted to 70 mol % or more, a polyamide to be obtained exhibits a high melting point and high crystallinity and can be suitably used for a variety of applications as a polyamide being excellent in heat resistance, chemical resistance, and the like and having low water absorbability. If the concentration of p-xylylenediamine in the diamine component used as a raw material is less than 70 mol %, the polyamide to be obtained has lowered heat resistance and chemical resistance and increased water absorbability.

A raw material diamine component other than p-xylylenediamine may be exemplified by, but not limited to, an aliphatic diamine such as 1,4-butanediamine, 1,6-hexanediamine, 1,8-octanediamine, 1,10-decanediamine, 1,12-dodecanediamine, 2-methyl-1,5-pentanediamine, 2,2,4-trimethyl-1,6-hexanediamine, 2,4,4-trimethyl-1,6-hexanediamine, 2-methyl-1,8-octanediamine, or 5-methyl-1,9-nonanediamine, an alicyclic diamine such as 1,3-bis(aminomethyl)cyclohexane, 1,4-bis(aminomethyl)cyclohexane, cyclohexanediamine, methylcyclohexanediamine, or isophoronediamine, an aromatic diamine such as m-xylylenediamine, or a mixture thereof.

The dicarboxylic acid component as a raw material of the polyamide (A) includes the linear aliphatic dicarboxylic acid having 6 to 18 carbon atoms at a concentration of 70 mol % or more, preferably 80 mol % or more, more preferably 90 mol % or more, particularly preferably 100 mol %. When the concentration of the linear aliphatic dicarboxylic acid having 6 to 18 carbon atoms is adjusted to 70 mol % or more, a polyamide to be obtained exhibits fluidity in melt processing, high crystallinity, and low water absorption and can be suitably used for a variety of applications as a polyamide excellent in heat resistance, chemical resistance, molding processability, and dimensional stability. If the concentration of the linear aliphatic dicarboxylic acid having 6 to 18 carbon atoms in the dicarboxylic acid component used as a raw material is less than 70 mol %, the polyamide to be obtained has lowered heat resistance, chemical resistance, and molding processability.

Examples of the linear aliphatic dicarboxylic acid having 6 to 18 carbon atoms may include adipic acid, pimelic acid, suberic acid, azelaic acid, sebacic acid, undecanedioic acid, dodecanedioic acid, tridecanedioic acid, tetradecanedioic acid, pentadecanedioic acid, and hexadecanedioic acid. Of those, preferred is at least one selected from the group consisting of azelaic acid, sebacic acid, undecanedioic acid, and dodecanedioic acid, and particularly preferred are sebacic acid and/or azelaic acid. In the case where an aliphatic dicarboxylic acid having 5 or less carbon atoms is used, the dicarboxylic acid has a low melting point and a low boiling point, and hence is distilled out from the reaction system during polycondensation reactions to change a reaction molar ratio between the diamine and the dicarboxylic acid, resulting in low mechanical properties and thermal stability of a polyamide to be obtained. Meanwhile, in the case where an aliphatic dicarboxylic acid having 19 or more carbon atoms is used, the heat resistance cannot be obtained because the melting point of the polyamide is significantly lowered.

A raw material dicarboxylic acid other than the linear aliphatic dicarboxylic acid having 6 to 18 carbon atoms may be exemplified by, but not limited to, malonic acid, succinic acid, 2-methyladipic acid, trimethyladipic acid, 2,2-dimethylglutaric acid, 2,4-dimethylglutaric acid, 3,3-dimethylglutaric acid, 3,3-diethylsuccinic acid, 1,3-cyclopentanedicarboxylic acid, 1,3-cyclohexanedicarboxylic acid, 1,4-cyclohexanedicarboxylic acid, isophthalic acid, terephthalic acid, 2,6-naphthalenedicarboxylic acid, 1,5-naphthalenedicarboxylic acid, 1,4-naphthalenedicarboxylic acid, 2,7-naphthalenedicarboxylic acid, or a mixture thereof.

A lactam such as ε-caprolactam or laurolactam, or an aliphatic aminocarboxylic acid such as aminocaproic acid or aminoundecanoic acid can also be used as a copolymerization component for constructing the polyamide (A) as well as the diamine components and the dicarboxylic acid components as long as an effect of the present invention is not impaired.

A small amount of a monofunctional compound having reactivity with a terminal amino group or a terminal carboxyl group of the polyamide may be added as a molecular weight modifier upon the polycondensation of the polyamide (A). Examples of the compound which can be used may include, but not limited to, aliphatic monocarboxylic acids such as acetic acid, propionic acid, butyric acid, valeric acid, caproic acid, caprylic acid, lauric acid, tridecylic acid, myristic acid, palmitic acid, stearic acid, and pivalic acid, aromatic monocarboxylic acids such as benzoic acid, toluic acid, and naphthalenecarboxylic acid, aliphatic monoamines such as butylamine, amylamine, isoamylamine, hexylamine, heptylamine, and octylamine, aromatic-aliphatic monoamines such as benzylamine and methylbenzylamine, and mixtures thereof.

In the case where a molecular weight modifier is used in polycondensation of the polyamide (A), a suitable amount of the molecular weight modifier used varies depending on, for example, the reactivity and boiling point of the molecular weight modifier used and reaction conditions, and is usually about 0.1 to 10% by mass with respect to the total of the diamine component and dicarboxylic acid component used as raw materials.

A phosphorus atom-containing compound is preferably added to a system of polycondensation of the polyamide (A) as an antioxidant for preventing coloring of the polyamide due to a catalyst for the polycondensation reaction and oxygen present in the polycondensation system.

Examples of the phosphorus atom-containing compound include alkaline earth metal salts of hypophosphorous acid, alkali metal salts of phosphorous acid, alkaline earth metal salts of phosphorous acid, alkali metal salts of phosphoric acid, alkaline earth metal salts of phosphoric acid, alkali metal salts of pyrophosphoric acid, alkaline earth metal salts of pyrophosphoric acid, alkali metal salts of metaphosphoric acid, and alkaline earth metal salts of metaphosphoric acid.

Specific examples thereof may include calcium hypophosphite, magnesium hypophosphite, sodium phosphite, sodium hydrogen phosphite, potassium phosphite, potassium hydrogen phosphite, lithium phosphite, lithium hydrogen phosphite, magnesium phosphite, magnesium hydrogen phosphite, calcium phosphite, calcium hydrogen phosphite, sodium phosphate, disodium hydrogen phosphate, sodium dihydrogen phosphate, potassium phosphate, dipotassium hydrogen phosphate, potassium dihydrogen phosphate, magnesium phosphate, dimagnesium hydrogen phosphate, magnesium dihydrogen phosphate, calcium phosphate, dicalcium hydrogen phosphate, calcium dihydrogen phosphate, lithium phosphate, dilithium hydrogen phosphate, lithium dihydrogen phosphate, sodium pyrophosphate, potassium pyrophosphate, magnesium pyrophosphate, calcium pyrophosphate, lithium pyrophosphate, sodium metaphosphate, potassium metaphosphate, magnesium metaphosphate, calcium metaphosphate, lithium metaphosphate, and mixtures thereof. Of those, preferred are calcium hypophosphite, magnesium hypophosphite, calcium phosphite, calcium hydrogen phosphite, and calcium dihydrogen phosphate, and more preferred is calcium hypophosphite. It should be noted that each of those phosphorus atom-containing compound may be a hydrate.

The amount of the phosphorus atom-containing compound added to the system of polycondensation of the polyamide (A) is 50 to 1,000 ppm, preferably 50 to 400 ppm, more preferably 60 to 350 ppm, particularly preferably 70 to 300 ppm in terms of a phosphorus atom concentration in the polyamide (A). In the case where the phosphorus atom concentration in the polyamide (A) is less than 50 ppm, the effect of the compound as the antioxidant is not sufficient exerted, and the polyamide resin composition is liable to be colored. Meanwhile, in the case where the phosphorus atom concentration in the polyamide (A) is more than 1,000 ppm, a gelation reaction of the polyamide resin composition is promoted, and foreign matter probably due to the phosphorus atom-containing compound may be mixed in a molded article, which is liable to deteriorate the appearance of the molded article.

The phosphorus atom concentration in the polyamide (A) is preferably derived from at least one kind of phosphorus atom-containing compound selected from the group consisting of an alkaline earth metal salt of hypophosphorous acid, an alkali metal salt of phosphorous acid, an alkaline earth metal salt of phosphorous acid, an alkali metal salt of phosphoric acid, an alkaline earth metal salt of phosphoric acid, an alkali metal salt of pyrophosphoric acid, an alkaline earth metal salt of pyrophosphoric acid, an alkali metal salt of metaphosphoric acid, and an alkaline earth metal salt of metaphosphoric acid, more preferably derived from at least one kind of phosphorus atom-containing compound selected from the group consisting of calcium hypophosphite, magnesium hypophosphite, calcium phosphite, and calcium dihydrogen phosphate.

Further, a polymerization rate modifier is preferably added to the system of polycondensation of the polyamide (A) in combination with the phosphorus atom-containing compound. In order to prevent coloring of the polyamide during polycondensation, it is necessary that there be a sufficient amount of the phosphorus atom-containing compound. However, the compound may cause gelation of the polyamide, and hence in order to control a reaction rate of amidation as well, the polymerization rate modifier is preferably used together with the compound.

Examples of the polymerization rate modifier include alkali metal hydroxides, alkaline earth metal hydroxides, alkali metal acetates, and alkaline earth metal acetates. Of those, alkali metal hydroxides and alkali metal acetates are preferred. Examples of the polymerization rate modifier include lithium hydroxide, sodium hydroxide, potassium hydroxide, rubidium hydroxide, cesium hydroxide, magnesium hydroxide, calcium hydroxide, strontium hydroxide, barium hydroxide, lithium acetate, sodium acetate, potassium acetate, rubidium acetate, cesium acetate, magnesium acetate, calcium acetate, strontium acetate, barium acetate, and mixtures thereof. Of those, preferred are sodium hydroxide, potassium hydroxide, magnesium hydroxide, calcium hydroxide, sodium acetate, and potassium acetate, and more preferred are sodium hydroxide, sodium acetate, and potassium acetate.

In the case where the polymerization rate modifier is added to the polycondensation system, from the viewpoint of a balance between promotion and suppression of the amidation reaction, the molar ratio between a phosphorus atom in the phosphorus atom-containing compound and the polymerization rate modifier (=[molar number of polymerization rate modifier]/[molar number of phosphorus atom in phosphorus atom-containing compound]) is preferably 0.3 to 1.0, more preferably 0.4 to 0.95, particularly preferably 0.5 to 0.9.

A polymerization method for the polyamide (A) may be an arbitrary method such as: (a) polycondensation in a molten state; (b) so-called solid-phase polymerization involving producing a low-molecular-weight polyamide by polycondensation in a molten state and heat-treating the resultant polyamide in a solid-phase state; or (c) extrusion polymerization involving producing a low-molecular-weight polyamide by polycondensation in a molten state and increasing the molecular weight in a molten state using a kneading extruder.

The method for polycondensation in a molten state is not particularly limited, and examples thereof may include: a method involving conducting polycondensation in a molten state while removing water and condensation water by heating an aqueous solution of a nylon salt of a diamine component and a dicarboxylic acid component under increased pressure; and a method involving conducting polycondensation at ordinary pressure or in a pressurized steam atmosphere by directly adding a diamine component to a dicarboxylic acid in a molten state. In the case where polymerization is carried out by directly adding a diamine to a dicarboxylic acid in a molten state, polycondensation is carried out while controlling the reaction temperature so that the temperature is not lower than the melting points of an oligoamide and a polyamide to be generated by continuously adding the diamine component to a molten dicarboxylic acid phase to keep the reaction system to a uniform liquid state. In the case where, in production of a product by the above-mentioned polycondensation method, the inside of a device is washed because of, for example, a change in the type of the product, triethylene glycol, ethylene glycol, m-xylylenediamine, or the like may be used.

The polyamide obtained by melt polycondensation is taken out first, pelletized, and then dried before use. The polyamide may be produced by solid-phase polymerization to further increase a polymerization degree. As a heating device to be used for drying or solid-phase polymerization, a continuous heat drying device, a rotary drum heating device called tumble dryer, conical dryer, or rotary dryer, and a cone-shaped heating device equipped with a blade on its inside, called nautamixer are suitably used. However, the device is not limited thereto, and a known method and device may be used. In particular, in the case of conducting solid-phase polymerization of the polyamide, of the above-mentioned devices, a rotary drum heating device is preferably used because the system can be sealed to facilitate polycondensation in a state in which oxygen, which causes coloring, is removed.

The polyamide (A) is less colored and less gelatinized. Further, the polyamide (A) has a YI value of 10 or less, preferably 6 or less, more preferably 5 or less, still more preferably 1 or less, in a color difference test in accordance with JIS-K-7105. A molded article obtained from a resin composition containing a polyamide (A) having a YI value of more than 10 is not preferred because the article has a yellowish color and hence has low marketability.

Although there are some indices of the polymerization degree of a polyamide, a relative viscosity is generally used. The relative viscosity of the polyamide (A) is preferably 1.5 to 5.0, more preferably 1.8 to 4.2, still more preferably 1.9 to 3.5, even more preferably 2.0 to 3.0 from the viewpoints of the appearance and molding processability of the molded article. It should be noted that the relative viscosity as used herein is a ratio of a falling time (t), which is measured for a solution obtained by dissolving 1 g of a polyamide in 100 mL of 96% sulfuric acid at 25° C. using a Cannon-Fenske viscometer, to a falling time (t0), which is measured for 96% sulfuric acid itself in the same manner as above, and is represented by the following equation (1).

$$\text{Relative viscosity} = t/t0 \quad (1)$$

The number average molecular weight (Mn) of the polyamide (A), which is determined by gel permeation chromatography (GPC) measurement, falls within the range of preferably from 10,000 to 50,000, more preferably from 12,000 to 40,000, still more preferably from 14,000 to 30,000. When the Mn is adjusted to the range, the mechanical strength of a molded article obtained from the polyamide is stabilized, and the polyamide has an appropriate melt viscosity necessary for satisfactory processability in terms of moldability.

Meanwhile, the dispersivity (weight average molecular weight/number average molecular weight=Mw/Mn) falls within the range of preferably from 1.5 to 5.0, more preferably from 1.5 to 3.5. When the dispersivity is adjusted to the range, fluidity in melting and stability of the melt viscosity are improved, resulting in satisfactory processability in melt kneading or melt molding. Further, the polyamide is satisfactory in toughness as well as some physical properties such as water absorption resistance, chemical resistance, and heat aging resistance.

<Filler (B)>

The filler (B) to be used in the polyamide resin composition of the present invention is preferably at least one selected from the group consisting of a fibrous filler (B1) and an inorganic filler (B2).

Examples of the fibrous filler (B1) include organic and inorganic fibrous fillers. Examples of the organic fibrous filler may include a wholly aromatic polyamide fiber such as an aramid fiber, and a cellulose fiber. Examples of the inorganic fibrous filler may include a glass fiber, a PAN-based or pitch-based carbon fiber, and a boron fiber. Examples thereof may further include: a fiber of a metal such as steel, SUS, brass, or copper; and a whisker or a needle crystal of an inorganic compound such as potassium titanate, aluminum borate, plaster, calcium carbonate, magnesium sulfate, sepiolite, xonotlite, or wollastonite.

Examples of the glass fiber include an alkali-free borosilicate glass fiber and an alkali-containing C-glass fiber. The size of the fiber is not particularly limited, and a fiber having a diameter of 3 to 30 μm may be used. In addition, a long fiber having a length of 5 to 50 mm may be used, or a short fiber having a length of 0.05 to 5 mm may be used.

The fibrous filler (B1) is preferably at least one selected from the group consisting of a glass fiber, a carbon fiber, a wholly aromatic polyamide fiber, a cellulose fiber, a metal fiber, and a whisker or a needle crystal of an inorganic compound, more preferably at least one selected from the group consisting of a glass fiber, a carbon fiber, and a whisker or a needle crystal of an inorganic compound.

In particular, in the case where the polyamide resin composition of the present invention is used for a sliding part, as the filler (B), at least one kind of fibrous filler (B1) selected from the group consisting of a glass fiber, a carbon fiber, and a whisker or a needle crystal of an inorganic compound is suitably used, and a glass fiber and/or a carbon fiber is particularly suitably used. In such case, an inorganic powdery filler or the like may be used in combination with the fibrous filler (B1) to achieve excellent molding accuracy and surface smoothness.

As the inorganic filler (B2), fillers having a variety of forms such as powder may be used, and the average particle size and shape thereof are not particularly limited. Specific examples thereof may include talc, mica, glass flake, wollastonite, montmorillonite, potassium titanate, magnesium sulfate, calcium sulfate, barium sulfate, sepiolite, xonotlite, boron nitride, aluminum borate, glass beads, calcium carbonate, magnesium carbonate, barium carbonate, silica, kaolin, clay, titanium oxide, zinc oxide, magnesium hydroxide, aluminum hydroxide, and mixtures thereof. Of those, calcium carbonate is suitably used as the inorganic filler (B2). Meanwhile, from the viewpoints of improvements in weather resistance and dimensional stability, the inorganic filler (B2) may be used in combination with the fibrous filler (B1).

The filler (B) may be used without any treatment, but in order to improve interfacial adhesion to the polyamide (A) or in order to improve dispersibility, the surface of the filler may be treated with any of various silane coupling agents, titanium coupling agents, higher fatty acids, higher fatty acid esters, higher fatty acid amides, higher fatty acid salts, other surfactants, and the like before use. The silane coupling agent is particularly preferably an aminosilane-based coupling agent. In addition, in the case where the filler (B) is the fibrous filler (B1), the filler may be secondarily processed into a cross shape and may be subjected to convergence or a treatment with a convergence agent to improve handleability.

The amount of the filler (B) blended is 1 to 200 parts by mass, preferably 5 to 200 parts by mass, more preferably 10 to 150 parts by mass, still more preferably 20 to 100 parts by mass with respect to 100 parts by mass of the polyamide (A). If the amount of the inorganic filler blended is less than 1 part by mass with respect to 100 parts by mass of the polyamide resin, effects of improving mechanical strength, thermal properties, and the like are small, while if the amount of the inorganic filler blended exceeds 200 parts by mass, fluidity in molding is impaired, resulting in low moldability. In particular, in the case where the filler (B) is the fibrous filler (B1), the amount of the fibrous filler (B1) blended is preferably 5 to 200 parts by mass, more preferably 10 to 150 parts by mass, still more preferably 20 to 100 parts by mass with respect to 100 parts by mass of the polyamide (A).

<Additive>

A variety of additives which are generally used in polymer materials may be blended in the polyamide resin composition of the present invention as long as the effect of the present invention is not impaired. Specific examples thereof may include an antioxidant, a colorant, a light stabilizer, a delustering agent, a heat stabilizer, a weathering stabilizer, an ultraviolet absorber, a nucleating agent, a plasticizer, a flame retardant, a solid lubricant, a mold release agent, an antistat, an anti-coloring agent, and an anti-gelling agent. However, the additives are not limited thereto, and a variety of materials may be blended.

(Solid Lubricant)

In the case where the polyamide resin composition of the present invention is a resin composition for a sliding part, the composition preferably contains a solid lubricant (C). Specific examples of the solid lubricant may include, but not limited to, fluorine-based resins such as polytetrafluoroethylene (PTFE) and a tetrafluoroethylene-ethylene copolymer, polyolefin-based resins such as polyethylene, graphite, carbon black, molybdenum disulfide, molybdenum trioxide, wholly aromatic polyamide resins such as an aramid resin, powders of, for example, silicone, a copper-lead alloy, tungsten disulfide, calcium sulfate, magnesium sulfate, and boron nitride, and mixtures thereof.

Of those, a fluorine-based resin, graphite, molybdenum disulfide, conductive granular carbon black, granular carbon black for a pigment, an aramid resin, and boron nitride are preferred, a fluorine-based resin, conductive granular carbon black, granular carbon black for a pigment, and graphite are more preferred, and a fluorine-based resin or graphite is particularly preferred. The fluorine-based resin is particularly preferably polytetrafluoroethylene.

The amount of the solid lubricant blended in the polyamide resin composition of the present invention varies depending on the type of the solid lubricant used, but in the case where the polyamide resin composition of the present invention is a resin composition for a sliding part, from the viewpoints of sliding property and mechanical properties of a molded article, the amount is preferably 5 to 50 parts by mass, more preferably 10 to 40 parts by mass with respect to 100 parts by mass of the polyamide (A).

(Mold Release Agent)

Specific examples of the mold release agent may include, but not limited to, a long-chain alcohol fatty acid ester, a branched alcohol fatty acid ester, a glyceride, a polyhydric alcohol fatty acid ester, a polymeric complex ester, a higher alcohol, ketone wax, montan wax, silicon oil, silicon gum, and mixtures thereof.

In the case where the polyamide resin composition of the present invention is a resin composition for a sliding part, in order to improve mold release property in molding, the composition preferably contains the mold release agent. In the case where the polyamide resin composition of the present invention is a resin composition for a sliding part, the agent is preferably added in a relatively large amount to achieve an effect of improving the sliding property as well.

The amount of the mold release agent blended in the polyamide resin composition of the present invention is not particularly limited as long as the various performances of the resin composition are not impaired. In general, the amount is preferably 0.01 to 5 parts by mass, more preferably 0.1 to 2 parts by mass with respect to 100 parts by mass of the polyamide (A). In the case where the polyamide resin composition of the present invention is a resin composition for a sliding part, the amount is preferably 0.05 to 7 parts by mass, more preferably 0.5 to 5 parts by mass with respect to 100 parts by mass of the polyamide (A).

(Antioxidant)

Examples of the antioxidant may include a copper-based antioxidant, a hindered phenol-based antioxidant, a hindered amine-based antioxidant, a phosphorus-based antioxidant, and a thio antioxidant.

Further, in the polyamide resin composition of the present invention, heat-resistant thermoplastic resins such as polyphenylene ether (PPE), polyphenylene sulfide, modified polyolefin, polyether sulfone (PES), polyether imide (PEI), and a molten liquid crystal polymer, modified products of the resins, and the like may be blended as long as the effect of the present invention is not impaired. In the case where the polyamide resin composition of the present invention is a resin composition for a sliding part, from the viewpoints of sliding property and mechanical properties of a molded article, the composition preferably contains such thermoplastic resin having a high melting point.

(Polyphenylene Sulfide)

Polyphenylene sulfide which may be blended in the polyamide resin composition of the present invention is a polymer having a structural unit represented by the following general formula (I) at a concentration of 70 mol % or more, preferably 90 mol % or more in total structural units.

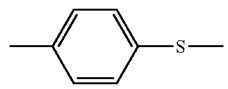
(I)

Examples of the polyphenylene sulfide which may be blended in the polyamide resin composition of the present invention may include a polymer having only the structural unit represented by the formula (I) as well as polymers having structural units represented by the following formulae (II) to (VI), and the polymer may include one kind or two or more kinds of the units.

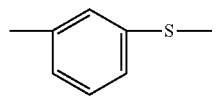
(II)

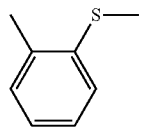
(III)

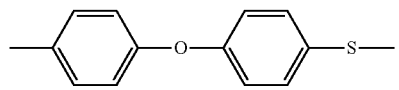
(IV)

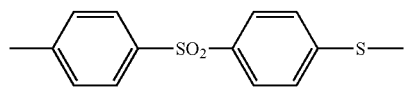
(V)

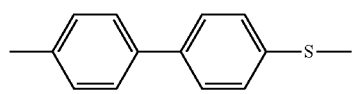
(VI)

The polyphenylene sulfide may further include a trifunctional structural unit represented by the following formula (VII) at a concentration of 10 mol % or less in the total structural units.

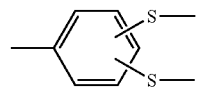
(VII)

The constituent units represented by the formulae (I) to (VII) may each have a substituent such as an alkyl group, a nitro group, a phenyl group, or an alkoxyl group on its aromatic ring.

The viscosity of the polyphenylene sulfide which may be blended in the polyamide resin composition of the present invention, which is determined using a flow tester under a load of 20 kg at a temperature of 300° C., preferably falls within the range of preferably from 100 to 10,000 poise, more preferably from 200 to 5,000 poise, still more preferably from 300 to 3,000 poise. The polyphenylene sulfide may be prepared by an arbitrary method.

In the polyamide resin composition of the present invention, from the viewpoint of heat resistance, a mass ratio between the polyamide (A) and the polyphenylene sulfide is preferably 5:95 to 99.9:0.1, more preferably 5:95 to 95:5, still more preferably 20:80 to 80:20.

(Modified Polyolefin)

As the modified polyolefin, there may be used a product obtained by modification of a polyolefin with an α,β-unsaturated carboxylic acid or an ester or metal salt derivative thereof through copolymerization, or by graft introduction of, for example, a carboxylic acid or an acid anhydride to a polyolefin. Specific examples thereof may include, but not limited to, an ethylene/propylene copolymer, an ethylene/1-butene copolymer, an ethylene/4-methyl-1-pentene copolymer, an ethylene/1-hexene copolymer, an ethylene/1-octene copolymer, an ethylene/1-decene copolymer, a propylene/ethylene copolymer, a propylene/1-butene copolymer, a propylene/4-methyl-1-pentene copolymer, a propylene/1-hexene copolymer, a propylene/1-octene copolymer, a propylene/1-decene copolymer, a propylene/1-dodecene copolymer, an ethylene/propylene/1,4-hexadiene copolymer, an ethylene/propylene/dicyclopentadiene copolymer, an ethylene/1-butene/1,4-hexadiene copolymer, and an ethylene/1-butene/5-ethylidene-2-norbornene copolymer.

In the polyamide resin composition of the present invention, from the viewpoints of mechanical strength, impact resistance, heat resistance, and the like, the amount of the modified polyolefin blended is preferably 0.5 to 50 parts by mass, more preferably 1 to 45 parts by mass, still more preferably 5 to 40 parts by mass with respect to 100 parts by mass of the polyamide (A).

(Molten Liquid Crystal Polymer)

It is preferred that the molten liquid crystal polymer have property of forming a liquid crystal in a molten phase (that is, exhibits optical anisotropy) and have an intrinsic viscosity [η], which is determined in pentafluorophenol at 60° C., of 0.1 to 5 dl/g.

Typical examples of the molten liquid crystal polymer may include, but not limited to: a polyester which is substantially formed of an aromatic hydroxycarboxylic acid unit; a polyester which is substantially formed of an aromatic hydroxycarboxylic acid unit, an aromatic dicarboxylic acid unit, and an aromatic diol unit; a polyester which is substantially formed of an aromatic hydroxycarboxylic acid unit, an aromatic dicarboxylic acid unit, and an aliphatic diol unit; a polyester amide which is substantially formed of an aromatic hydroxycarboxylic acid unit and an aromatic aminocarboxylic acid unit; a polyester amide which is substantially formed of an aromatic hydroxycarboxylic acid unit, an aromatic dicarboxylic acid unit, and an aromatic diamine unit; a polyester amide which is substantially formed of an aromatic hydroxycarboxylic acid unit, an aromatic aminocarboxylic acid unit, an aromatic dicarboxylic acid unit, and an aromatic diol unit; and a polyester amide which is substantially formed of an aromatic hydroxycarboxylic acid unit, an aromatic aminocarboxylic acid unit, an aromatic dicarboxylic acid unit, and an aliphatic diol unit.

Examples of the aromatic hydroxycarboxylic acid unit for constructing the molten liquid crystal polymer may include units derived from p-hydroxybenzoic acid, m-hydroxybenzoic acid, 6-hydroxy-2-naphthoic acid, 7-hydroxy-2-naphthoic acid, and the like.

Examples of the aromatic dicarboxylic acid unit may include units derived from terephthalic acid, isophthalic acid, chlorobenzoic acid, 4,4'-biphenyldicarboxylic acid, 2,6-naphthalenedicarboxylic acid, 2,7-naphthalenedicarboxylic acid, 4,4'-oxydibenzoic acid, diphenylmethane-4,4'-dicarboxylic acid, diphenylsulfone-4,4'-dicarboxylic acid, and the like.

Examples of the aromatic diol acid unit may include units derived from hydroquinone, resorcinol, methylhydroquinone, chlorohydroquinone, phenylhydroquinone, 4,4'-dihydroxybiphenyl, 2,6-dihydroxynaphthalene, 2,7-dihydroxynaphthalene, 4,4'-dihydroxybiphenyl ether, 4,4'-dihydroxybiphenylmethane, 4,4'-dihydroxybiphenyl sulfone, and the like.

Examples of the aliphatic diol acid unit may include units derived from ethylene glycol, propylene glycol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, and the like.

Examples of the aromatic aminocarboxylic acid unit may include units derived from p-aminobenzoic acid, m-aminobenzoic acid, 6-amino-2-naphthoic acid, 7-amino-2-naphthoic acid, and the like.

Examples of the aromatic diamine unit may include units derived from p-phenylenediamine, m-phenylenediamine, 4,4'-diaminobiphenyl, 2,6-diaminonaphthalene, 2,7-diaminonaphthalene, and the like.

Preferred examples of the molten liquid crystal polymer may include: a polyester which is formed of a p-hydroxybenzoic acid unit and a 6-hydroxy-2-naphthoic acid unit; a polyester which is formed of a p-hydroxybenzoic acid unit, a 4,4'-dihydroxybiphenyl unit, and a terephthalic acid unit; a polyester which is formed of a p-hydroxybenzoic acid unit, an ethylene glycol unit, and a terephthalic acid unit; and a polyester amide which is formed of a p-hydroxybenzoic acid unit, a 6-hydroxy-2-naphthoic acid unit, and p-aminobenzoic acid unit.

In the thermoplastic resin composition of the present invention, from the viewpoints of molding processability, dimensional stability and chemical resistance of a molded article, and the like, the amount of the molten liquid crystal polymer blended is preferably 0.1 to 200 parts by mass, more preferably 0.5 to 150 parts by mass, still more preferably 1 to 100 parts by mass with respect to 100 parts by mass of the polyamide (A).

A production method for the polyamide resin composition of the present invention is not particularly limited, and the composition can be produced by: blending predetermined amounts of the polyamide (A), the filler (B), and, as required, the solid lubricant (C), another additive, and another resin; and melt-kneading the mixture. The melt-kneading can be carried out by a conventionally known method. For example, the melt-kneading may be carried out by feeding all materials using a mono-screw or twin-screw extruder, a Banbury mixer, or another device similar to them from the base of the extruder in one step; or a method involving: feeding resin components first; and kneading the components with melting together with a side-fed fibrous reinforcement may be carried out to produce pellets. Further, the method may be one which involves pelletizing different kinds of compound products and blending the resultant pellets, or one which involves separately blending part of a powder component or a liquid component.

<Molded Article>

The polyamide resin composition of the present invention may be used to produce a molded product having a desired shape by a known molding method such as injection molding, blow molding, extrusion molding, compression molding, stretching, or vacuum molding. The composition may be molded as an engineering plastic not only into a molded article but also into a shape of a film, a sheet, a hollow container, a tube, or the like, and is suitably used for industrial raw materials, industrial materials, household products, and the like.

The molded article including the polyamide resin composition of the present invention is suitably used for a variety of applications such as transporting equipment parts, electrical and electronic parts, and sliding parts.

Specific examples of the transporting equipment parts include: an automotive part such as an engine mount, an engine cover, a torque control lever, a window regulator, a headlamp reflector, a door mirror stay, or a radiator tank; and an aircraft part such as a main wing.

Specific examples of the electrical and electronic parts include electrical and electronic parts to be mounted on a printed-circuit board, such as a connector, a switch, a housing for IC or LED, a socket, a relay, a resistor, a condenser, a capacitor, and a coil bobbin.

Specific examples of the sliding parts include a hearing, a gear, a hush, a spacer, a roller, and a cam.

Meanwhile, a surface of the molded product obtained by molding the polyamide resin composition may be coated with a metal such as aluminum or zinc by a known method such as a vacuum deposition method to form a metal layer on the surface. Before coating with the metal, the part to be coated may be treated with a primer in advance. The polyamide resin composition exhibits satisfactory adhesion property with the metal layer.

The metal for forming the metal coating is not particularly limited as long as the metal can be deposited from the vapor, and examples thereof include Group 4 metals (such as Ti, Zr, and Hf), Group 5 metals (such as V, Nb, and Ta), Group 6 metals (such as Cr, Mo, and W), Group 7 metals (such as Mn, Tc, and Re), Group 8 metals (such as Fe, Ru, and Os), Group 9 metals (such as Co, Rh, and Ir), Group 10 metals (Ni, Pd, and Pt), Group 11 metals (Cu, Ag, and Au), Group 12 metals (such as Zn and Cd), Group 13 metals (such as Al, Ga, In, and Tl), Group 14 metals (such as Ge, Sn, and Pb), and Group 15 metals (such as Sb and Bi). As a metal oxide coating, there may be used any of metal oxides corresponding to the metals (such as tin oxide, indium oxide, silicon oxide, titanium oxide, and zinc oxide). The metals may be used alone or as an alloy or a composite of two or more kinds thereof (such as an indium oxide/tin oxide composite (ITO)) to form the metal coating or the metal oxide coating. Of those, highly conductive metals (such as Ag, Cu, and Al) are preferred, and Al is particularly preferred from the viewpoints of electromagnetic shielding property and conductivity of a metal-coated or a metal oxide-coated molded article, and the like.

As a deposition method, there is given, for example, a gas phase method such as a PVD method (such as a vacuum deposition method, an ion plating method, a sputtering method, or a molecular beam epitaxy method), a CVD method (such as a thermal CVD method, a plasma CVD method, a metal organic chemical vapor deposition method (MOCVD method), or a photo-CVD method), an ion beam mixing method, or an ion injection method. A meal coating or a metal oxide coating obtained by any one of the deposition methods may be a single coating or a complex coating including two or more kinds of coatings (laminated film). For example, an Al coating or the like may be formed alone, or a coating including a metal other than Cu (such as a Zn coating or an Sn coating) may be formed on a Cu coating.

In particular, in the case where a thick metal coating is formed, a thin metal coating or a conductive metal oxide coating may be formed by the deposition method and then electroplated. Electrolytic plating may be carried out by a conventional plating method. For example, a variety of plating baths may be used depending on the type of a coating to be formed. For example, in the case of chrome plating, there may be used a Sargent bath, a low-concentration chrome plating bath, a fluoride bath (such as a chromic acid-sodium silicofluoride-sulfuric acid bath), an SRHS bath, a tetrachromate bath, a microcrack chrome plating bath, or the like. In the case of nickel plating, there may be used a non-bright nickel plating method (such as a Watts-type bath, a nickel sulfamate bath, or a chloride bath), a bright nickel plating method (such as organic bright nickel plating), or the like. In the case of copper plating, there may be used an acidic bath (such as a copper sulfate bath or a copper borofluoride bath), an alkaline bath (such as a copper cyanide bath or a copper pyrophosphate bath), or the like. In the case of zinc plating, there may be used, for example, a zincate bath, an amine bath, a pyrophosphoric acid bath, a sulfuric acid bath, a borofluoride bath, or a chloride bath.

Such molded article having a metal layer on a surface thereof can be used as an automotive part such as a lump reflector, a side molding, a radiator grill, an emblem, a bumper, a wheel, a side mirror, or a radiator panel, or an electrical part or electronic part such as a wiring board, a personal computer which utilizes electromagnetic shielding property, a housing for a mobile phone, a metal thin film resistor, a switch, or a connector.

EXAMPLES

Hereinafter, the present invention is described in more detail by way of Examples and Comparative Examples, but is not limited to the examples. It should be noted that measurement for a variety of items in the examples was carried out by the following methods.

(1) Relative Viscosity of Polyamide 1 g of a polyamide was weighed accurately and dissolved in 100 ml of 96% sulfuric acid with stirring at 20 to 30° C. After the polyamide was dissolved completely, 5 ml of the solution were immediately taken to a Canon-Fenske viscometer and allowed to stand in a thermostat bath at 25° C. for 10 minutes, and then a falling time (t) was measured. Meanwhile, a falling time (t0) of 96% sulfuric acid itself was measured in the same way as above. A relative viscosity was calculated from the t and t0 values by the following equation (1).

$$\text{Relative viscosity} = t/t0 \tag{1}$$

(2) YI Value of Polyamide

In accordance with JIS-K-7105, a YI value was measured by a reflection method. A polyamide having a higher YI value is evaluated to be more colored in yellow. As a device for measurement of the YI value, a color difference measurement device manufactured by Nippon Denshoku Industries Co., Ltd. (type: Z-Σ80 Color Measuring System) was used.

(3) Phosphorus Atom Concentration

A phosphorus atom concentration was measured by a fluorescent X-ray analysis. As a measurement device, ZSX primus (tradename) manufactured by Rigaku Corporation was used. The analysis was carried out under conditions of: vacuum tube: Rh 4 kW; atmosphere: vacuum; analysis window: polyester film 5 μm; measurement mode: EZ scan; and measurement diameter: 30 mmϕ. Calculation was carried out by SQX calculation using software manufactured by Rigaku Corporation.

(4) Molecular Weight

A molecular weight was measured by gel permeation chromatography (GPC). As a measurement device, Shodex GPC SYSTEM-11 (tradename) manufactured by Showa Denko K.K. was used. As a solvent, hexafluoroisopropanol (HFIP) was used, and 10 mg of a polyamide used as a sample was dissolved in 10 g of HFIP and used in measurement. Measurement was carried out using two GPC standard columns HFIP-806M (tradename) (column size: 300×8.0 mm I.D.) manufactured by Showa Denko K.K. as measurement columns and two reference columns HFIP-800 (tradename) under conditions of: column temperature: 40° C.; and solvent flow rate: 1.0 mL/min. As a standard sample, polymethyl methacrylate (pMMA) was used, and SIC-480 II (tradename) manufactured by Showa Denko K.K. was used as data processing software to determine a number average molecular weight (Mn) and a weight average molecular weight (Mw).

(5) Mechanical Properties of Molded Article

Mechanical properties of a molded article were measured under conditions shown in Table 1.

TABLE 1

| Test item | Test method | Test piece dimension |
|---|---|---|
| Tensile strength | According to ISO527 | ISO3167 dumbbell piece |
| Tensile elastic modulus | Same as above | Same as above |
| Bending strength | According to ISO178 | 80 × 10 × 4 mm |
| Bending elastic modulus | Same as above | 80 × 10 × 4 mm |
| Charpy impact strength | According to ISO179 | 80 × 10 × 4 mm |
| High-temperature bending elastic modulus | According to ISO178, measured at 140° C. | 80 × 10 × 4 mm |
| Deflection temperature under load | According to ISO75 | 80 × 10 × 4 mm |

(6) Equilibrium Water Absorption

The absolute dry mass of a disk-shaped test piece (diameter 50 mm×thickness 3 mm) was weighed, and then the test piece was dipped in atmospheric boiling water. Changes of the mass were measured with time, and the water absorption at the time when no change in the mass was observed was determined as an equilibrium water absorption.

(7) Sliding Property

A sliding test of a resin ring against a resin ring was carried out on a Suzuki-type sliding tester. The sliding surface was polished using emery #1200 and set on the bottom side of the device. A comparative abrasion quantity was measured under conditions of: contact area: 2 cm²; surface pressure: 0.49 MPa; speed: 100 m/s; sliding time: 8 hours.

(8) Metal Deposition Property

Aluminum was deposited on the surface of a test piece by a vacuum deposition method to form an aluminum deposited film with a film thickness of 10 μm. Next, a pressure-sensitive adhesive tape was adhered firmly to the aluminum deposited film and then peeled off, and the peeling state of the deposited film was visually observed. Evaluation was carried out based on the following criteria. It should be noted that deposition was carried out using JEE-400 (manufactured by JEOL, Ltd., tradename) at a vacuum degree of 1 Torr.

A: Not peeled off to any degree, B: Partially peeled off, C: Peeled off

Synthesis Example 1

8,950 g (44.25 mol) of sebacic acid, 12.54 g (0.073 mol) of calcium hypophosphite, and 6.45 g (0.073 mol) of sodium acetate were weighed accurately and fed to a reaction container having an inner volume of 50 L and equipped with a stirrer, a dephlegmator, a cooler, a thermometer, a dropping device, a nitrogen inlet tube, and a strand die (a molar ratio between a phosphorus atom in calcium hypophosphite and sodium acetate was 0.5). Air in the reaction container was sufficiently replaced with nitrogen, and the container was pressurized with nitrogen to 0.3 MPa and heated with stirring to 160° C. to melt sebacic acid uniformly. Subsequently, 6,026 g (44.25 mol) of p-xylylenediamine were added dropwise with stirring over 170 minutes. During this procedure, the inner temperature of the reaction container was raised continuously up to 281° C. In the dropping step, the pressure was controlled to 0.5 MPa, and generated water was removed to the outside of the system through the dephlegmator and cooler. The temperature of the dephlegmator was controlled so as to fall within the range of from 145 to 147° C. After completion of dropping of p-xylylenediamine, the pressure was reduced at a rate of 0.4 MPa/h to ordinary pressure over 60 minutes. During this procedure, the inner temperature was raised up to 300° C. After that, the pressure was reduced at a rate of 0.002 MPa/min to 0.08 MPa over 20 minutes. Subsequently, the reaction was continued at 0.08 MPa until the torque of the stirring device reached a predetermined value. After that, the system was pressurized with nitrogen, and a polymer was taken out from the strand die and pelletized, to thereby obtain about 13 kg of a polyamide (PA1).

Table 2 shows values of physical properties of the resultant polyamide (PA1). The polyamide (PA1) was found to have a phosphorus atom concentration of 315 ppm, a YI value of −6.5, a relative viscosity of 2.47, a number average molecular weight Mn of 21,000, and an Mw/Mn of 2.6.

Synthesis Example 2

Melt polycondensation was carried out in the same manner as in Synthesis Example 1 except that the kind and blending amount of the dicarboxylic acid were changed to 8,329 g (44.25 mol) of azelaic acid, to thereby obtain a polyamide (PA2).

Table 2 shows values of physical properties of the resultant polyamide (PA2). The polyamide (PA2) was found to have a phosphorus atom concentration of 302 ppm, a YI value of −1.0, a relative viscosity of 2.22, a number average molecular weight Mn of 17,500, and an Mw/Mn of 2.5.

Synthesis Example 3

Melt polycondensation was carried out in the same manner as in Synthesis Example 1 except that the diamine component was changed to 5,423 g (39.82 mol) of p-xylylenediamine and 603 g (4.43 mol) of m-xylylenediamine (p-xylylenediamine and m-xylylenediamine accounted for 90 mol % and 10 mol % of the diamine component, respectively), to thereby obtain a polyamide (PA3).

Table 2 shows values of physical properties of the resultant polyamide (PA3). The polyamide (PA3) was found to have a phosphorus atom concentration of 300 ppm, a YI value of −2.0, a relative viscosity of 2.11, a number average molecular weight Mn of 17,200, and an Mw/Mn of 2.7.

Synthesis Example 4

Melt polycondensation was carried out in the same manner as in Synthesis Example 1 except that the amount of calcium hypophosphite blended was changed to 1.19 g (0.007 mol), and the amount of sodium acetate blended was changed to 0.57 g (0.007 mol) (a molar ratio between a phosphorus atom in calcium hypophosphite and sodium acetate was 0.5), to thereby obtain a polyamide (PA4).

Table 2 shows values of physical properties of the resultant polyamide (PA4). The polyamide (PA4) was found to have a phosphorus atom concentration of 28 ppm, a YI value of 25.0, a relative viscosity of 2.23, a number average molecular weight Mn of 18,000, and an Mw/Mn of 2.6.

Synthesis Example 5

Melt polycondensation was carried out in the same manner as in Synthesis Example 1 except that the amount of calcium hypophosphite blended was changed to 49.25 g (0.292 mol), and the amount of sodium acetate blended was changed to 23.95 g (0.292 mol) (a molar ratio between a phosphorus atom in calcium hypophosphite and sodium acetate was 0.5). In this case, the molecular weight increased significantly during melt polymerization, and it was difficult to control the molecular weight.

Table 2 shows values of physical properties of the resultant polyamide (PA5). The polyamide (PA5) was found to have a phosphorus atom concentration of 1,210 ppm, a YI value of 0.5, a relative viscosity of 2.42, a number average molecular weight Mn of 40,000, and an Mw/Mn of 2.7.

TABLE 2

| | Polyamide | | Phosphorus atom-containing compound | | Polymerization rate modifier | | Phosphorus atom concentration (ppm) | YI value | Relative viscosity | Number average molecular weight Mn | Mw/Mn |
|---|---|---|---|---|---|---|---|---|---|---|---|
| | Dicarboxylic acid | Diamine | Name of substance | Addition amount (mol) | Name of substance | Addition amount (mol) | | | | | |
| Synthesis Example 1 | PA1 Sebacic acid | PXDA | Calcium hypophosphite | 0.073 | Sodium acetate | 0.073 | 315 | −6.5 | 2.47 | 21,000 | 2.6 |

TABLE 2-continued

| | | Polyamide | | Phosphorus atom-containing compound | | Polymerization rate modifier | | Phosphorus atom concentration (ppm) | YI value | Relative viscosity | Number average molecular weight Mn | Mw/Mn |
|---|---|---|---|---|---|---|---|---|---|---|---|---|
| | | Dicarboxylic acid | Diamine | Name of substance | Addition amount (mol) | Name of substance | Addition amount (mol) | | | | | |
| Synthesis Example 2 | PA2 | Azelaic acid | PXDA | Calcium hypophosphite | 0.073 | Sodium acetate | 0.073 | 302 | −1.0 | 2.22 | 17,500 | 2.5 |
| Synthesis Example 3 | PA3 | Sebacic acid | PXDA/MXDA = 90/10 | Calcium hypophosphite | 0.073 | Sodium acetate | 0.073 | 300 | −2.0 | 2.11 | 17,200 | 2.7 |
| Synthesis Example 4 | PA4 | Sebacic acid | PXDA | Calcium hypophosphite | 0.007 | Sodium acetate | 0.007 | 28 | 25.0 | 2.23 | 18,000 | 2.6 |
| Synthesis Example 5 | PA5 | Sebacic acid | PXDA | Calcium hypophosphite | 0.292 | Sodium acetate | 0.292 | 1,210 | 0.5 | 2.42 | 40,000 | 2.7 |

PXDA: p-xylylenediamine
MXDA: m-xylylenediamine

Example 101

The polyamide (PA1), which had been dried under reduced pressure at 150° C. for 7 hours, was fed to a base hopper of a twin-screw extruder (manufactured by TOSHIBA MACHINE CO., LTD., tradename: TEM37BS) at a rate of 8 kg/h, and extruded at a cylinder temperature of 280 to 300° C. and a screw rotation speed of 150 rpm, and side-feeding of 100 parts by mass of a glass fiber (manufactured by Nippon Electric Glass Co., Ltd., tradename: 03T-296GH) with respect to 100 parts by mass of the polyamide (PA1) was carried out at a rate of 2 kg/h, to thereby prepare resin pellets. The resultant resin pellets were subjected to injection molding using an injection molding machine (manufactured by FANUC CORPORATION, tradename: FANUC i100) at a cylinder temperature of 300° C. and a mold temperature of 120° C., to thereby obtain a test piece for evaluation. For the resultant test piece, physical properties of the molded article were measured. Table 3 shows the results of the evaluation.

Example 102

A test piece for evaluation was obtained in the same manner as in Example 101 except that the polyamide (PA1) was changed to the polyamide (PA2). For the resultant test piece, physical properties of the molded article were measured. Table 3 shows the results of the evaluation.

Example 103

A test piece for evaluation was obtained in the same manner as in Example 101 except that the polyamide (PA1) was changed to the polyamide (PA3). For the resultant test piece, physical properties of the molded article were measured. Table 3 shows the results of the evaluation.

Example 104

A test piece for evaluation was obtained in the same manner as in Example 101 except that the amount of the glass fiber blended was changed from 100 parts by mass to 50 parts by mass. For the resultant test piece, physical properties of the molded article were measured. Table 3 shows the results of the evaluation.

Example 105

A test piece for evaluation was obtained in the same manner as in Example 101 except that 100 parts by mass of the glass fiber were changed to 60 parts by mass of the glass fiber and 40 parts by mass of calcium carbonate. For the resultant test piece, physical properties of the molded article were measured. Table 3 shows the results of the evaluation.

Example 106

A test piece for evaluation was obtained in the same manner as in Example 104 except that the glass fiber was changed to a carbon fiber. For the resultant test piece, physical properties of the molded article were measured. Table 3 shows the results of the evaluation.

Example 107

A test piece for evaluation was obtained in the same manner as in Example 101 except that the amount of the glass fiber blended was changed from 100 parts by mass to 5 parts by mass. For the resultant test piece, physical properties of the molded article were measured. Table 3 shows the results of the evaluation.

Example 108

A test piece for evaluation was obtained in the same manner as in Example 101 except that the amount of the glass fiber blended was changed from 100 parts by mass to 180 parts by mass. For the resultant test piece, physical properties of the molded article were measured. Table 3 shows the results of the evaluation.

Comparative Example 101

A polyamide 6T (polyhexamethylene terephthalamide, manufactured by Solvay, tradename: Amodel) was fed to a base hopper of a twin-screw extruder (manufactured by TOSHIBA MACHINE CO., LTD., tradename: TEM37BS) at a rate of 8 kg/h, and extruded at a cylinder temperature of 300 to 340° C. and a screw rotation speed of 150 rpm, and side-feeding of 100 parts by mass of a glass fiber (manufactured by Nippon Electric Glass Co., Ltd., tradename: 03T-296GH) with respect to 100 parts by mass of the resin was carried out at a rate of 2 kg/h, to thereby prepare resin pellets. The resultant resin pellets were subjected to injection molding using an injection molding machine (manufactured by FANUC CORPORATION, tradename: FANUC i100) at a cylinder temperature of 340° C. and a mold temperature of 130° C., to thereby obtain a test piece for evaluation. For the resultant test piece, physical properties of the molded article were measured. Table 3 shows the results of the evaluation.

Comparative Example 102

A polyamide 46 (polytetramethylene adipamide, manufactured by DSM, tradename: Stanyl) was fed to a base hopper of a twin-screw extruder (manufactured by TOSHIBA MACHINE CO., LTD., tradename: TEM37BS) at a rate of 8 kg/h, and extruded at a cylinder temperature of 290 to 310° C. and a screw rotation speed of 150 rpm, and side-feeding of 100 parts by mass of a glass fiber (manufactured by Nippon Electric Glass Co., Ltd., tradename: 03T-296 GH) with respect to 100 parts by mass of the resin was carried out at a rate of 2 kg/h, to thereby prepare resin pellets. The resultant resin pellets were subjected to injection molding using an injection molding machine (manufactured by FANUC CORPORATION, tradename: FANUC i100) at a cylinder temperature of 310° C. and a mold temperature of 120° C., to thereby obtain a test piece for evaluation. For the resultant test piece, physical properties of the molded article were measured. Table 3 shows the results of the evaluation.

Comparative Example 103

A polyamide 9T (manufactured by KURARAY CO., LTD., tradename: Kuraray Genestar G2330, containing 56% by mass of a glass fiber) was subjected to injection molding using an injection molding machine (manufactured by FANUC CORPORATION, tradename: FANUC i100) at a cylinder temperature of 320° C. and a mold temperature of 140° C., to thereby obtain a test piece for evaluation. For the resultant test piece, physical properties of the molded article were measured. Table 3 shows the results of the evaluation.

Comparative Example 104

A test piece for evaluation was obtained in the same manner as in Example 101 except that the polyamide (PA1) was changed to the polyamide (PA4). For the resultant test piece, physical properties of the molded article were measured. Table 3 shows the results of the evaluation.

Comparative Example 105

A test piece for evaluation was obtained in the same manner as in Example 101 except that the polyamide (PA1) was changed to the polyamide (PA5). For the resultant test piece, physical properties of the molded article were measured. Table 3 shows the results of the evaluation.

Comparative Example 106

A test piece for evaluation was obtained in the same manner as in Example 101 except that the amount of the glass fiber blended was changed from 100 parts by mass to 0.5 part by mass. For the resultant test piece, physical properties of the molded article were measured. Table 3 shows the results of the evaluation.

Comparative Example 107

An attempt to prepare resin composition pellets was made in the same manner as in Example 101 except that the amount of the glass fiber blended was changed from 100 parts by mass to 250 parts by mass. However, it was impossible to prepare the resin composition pellets because fuzzy strands were formed.

Comparative Example 108

A test piece for evaluation of the polyamide (PA1) in which no glass fiber was blended was prepared. For the resultant test piece, physical properties of the molded article were measured. Table 3 shows the results of the evaluation.

TABLE 3

|  |  | Example 101 | Example 102 | Example 103 | Example 104 | Example 105 | Example 106 | Example 107 | Example 108 |
|---|---|---|---|---|---|---|---|---|---|
| Polyamide (A) (parts by mass) |  | PA1 100 | PA2 100 | PA3 100 | PA1 100 | PA1 100 | PA1 100 | PA1 100 | PA1 100 |
| Filler (B) (parts by mass) | Glass fiber | 100 | 100 | 100 | 50 | 60 | — | 5 | 180 |
|  | Carbon fiber | — | — | — | — | — | 50 | — | — |
|  | Calcium carbonate | — | — | — | — | 40 | — | — | — |
| Physical properties of molded article |  |  |  |  |  |  |  |  |  |
| Tensile strength (MPa) |  | 259 | 256 | 253 | 171 | 169 | 385 | 90 | 275 |
| Tensile elastic modulus (GPa) |  | 18.5 | 17.8 | 18.1 | 10.8 | 10.0 | 26.8 | 3.5 | 23.0 |
| Bending strength (MPa) |  | 394 | 366 | 341 | 261 | 250 | 420 | 130 | 435 |
| Bending elastic modulus (GPa) |  | 16.2 | 16.0 | 16.0 | 10 | 9.5 | 22.5 | 3.5 | 21.0 |
| Charpy impact strength (kJ/m$^2$) |  | 19 | 17.3 | 20.8 | 40 | 14.8 | 46 | 58 | 15.2 |
| High-temperature bending elastic modulus (GPa) |  | 10.4 | 10.1 | 9.6 | 8.6 | 8.9 | 8.8 | — | 11.6 |
| Deflection temperature under load (° C.) |  | 272 | 269 | 262 | 256 | 271 | 259 | 230 | 276 |
| Equilibrium water absorption (% by mass) |  | 1.5 | 1.6 | 1.4 | 1.8 | 1.4 | 1.8 | 2.6 | 1 |
| Metal deposition property |  | A | A | A | A | A | A | A | A |

|  |  | Comparative Example 101 | Comparative Example 102 | Comparative Example 103 | Comparative Example 104 | Comparative Example 105 | Comparative Example 106 | Comparative Example 107 | Comparative Example 108 |
|---|---|---|---|---|---|---|---|---|---|
| Polyamide (A) (parts by mass) |  | PA6T[1] 100 | PA46[2] 100 | PA9T[3] | PA4 100 | PA5 100 | PA1 100 | PA1 100 | PA1 100 |
| Filler (B) (parts by mass) | Glass fiber | 100 | 100 |  | 100 | 100 | 0.5 | 250 | — |
|  | Carbon fiber | — | — | — | — | — | — | — | — |
|  | Calcium carbonate | — | — | — | — | — | — | — | — |

TABLE 3-continued

| Physical properties of molded article | | | | | | | | |
|---|---|---|---|---|---|---|---|---|
| Tensile strength (MPa) | 149 | 171 | 161 | 245 | 240 | 83 | It was impossible to prepare pellets because of fuzzy strands. | 89 |
| Tensile elastic modulus (GPa) | 17.1 | 17.2 | 13.6 | 18.1 | 16.6 | 3.1 | | 3.4 |
| Bending strength (MPa) | 245 | 235 | 236 | 385 | 388 | 128 | | 100 |
| Bending elastic modulus (GPa) | 15.8 | 13.2 | 13.3 | 17.0 | 17.2 | 2.9 | | 2.4 |
| Charpy impact strength (kJ/m$^2$) | 13.6 | 15.2 | 15.6 | 18.0 | 19.1 | 63 | | 85 |
| High-temperature bending elastic modulus (GPa) | 8.3 | 9.0 | — | 10.2 | 10.6 | — | | — |
| Deflection temperature under load (° C.) | 265 | 290 | 285 | 271 | 272 | 221 | | 125 |
| Equilibrium water absorption (% by mass) | 3.4 | 3.6 | 1.9 | 1.4 | 1.4 | 2.7 | | 2.8 |
| Metal deposition property | B | B | B | A | A | A | Same as above | A |

[1])PA6T: manufactured by Solvay, tradename: Amodel
[2])PA46: manufactured by DSM, tradename: Stanyl
[3])PA9T: manufactured by KURARAY CO., LTD., tradename: Kuraray Genestar G2330, containing 56% by mass of a glass fiber It should be noted that, in Example 107 and Comparative Examples 103, 106, and 108, the high-temperature bending elastic moduli were not measured.

As clear from Table 3, each of the molded articles of Comparative Examples 101 to 103 using the polyamide 6T, the polyamide 46, or the polyamide 9T was found to have low mechanical strength and a low elastic modulus and had high equilibrium water absorption. A nylon 46 resin, which has conventionally been studied as a resin for an electronic part, is a resin obtained from tetramethylenediamine and adipic acid, and is excellent in heat resistance and mechanical properties. However, the resin contains an amide group at a higher ratio compared with usual polyamide resins such as a nylon 6 resin and a nylon 66 resin and hence has the drawback of high water absorption. Therefore, although the nylon 46 resin has excellent heat resistance and mechanical properties in a dry state, in actual use, the resin has a higher water absorption compared with usual polyamide resins and hence shows larger reductions in heat resistance and mechanical properties compared with the usual resins. Further, the high water absorption leads to a large change in dimension accordingly, and hence the dimensional accuracy is insufficient in some cases. Therefore, it is difficult to use the resin in parts required to have high accuracy. Moreover, due to a water absorption state, in mounting on a substrate in a surface mounting system, damage called blister appears on the surface of a part, resulting in significantly lowered performance and reliability of the part.

In addition, as for metal deposition property, each of the molded articles of Comparative Examples 101 to 103 using the polyamide 6T, the polyamide 46, or the polyamide 9T was found to have low adhesion property to a metal layer.

Next, the polyamide (PA4) having a phosphorus atom concentration of 50 ppm or less has a large YI value, and hence the molded article obtained from the polyamide has a yellowish color and has a lowered commercial value (Comparative Example 104). Meanwhile, in the case of the polyamide (PA5) having a phosphorus atom concentration of 1,000 ppm or more, the molecular weight increased significantly during melt polymerization, and it was impossible to control the molecular weight (Comparative Example 105).

Further, in the case of the resin composition of Comparative Example 107 which was obtained by adding an excessive amount of the filler (B), fuzzy strands were produced in pelletization, and hence it was impossible to produce pellets.

On the other hand, each of the molded articles of Examples 101 to 108 was found to have low water absorption and to be excellent in the mechanical properties and heat resistance.

Meanwhile, in the case of each of the polyamide (PA1) to polyamide (PA3) used in Examples 101 to 108, the molecular weight was able to be controlled in melt polymerization. Further, the resultant resin was hardly colored, and the molded article formed was found to have excellent appearance. In addition, each of the molded articles of Examples 101 to 108 obtained by using the polyamide resins was found to have low water absorption and to be excellent in flame retardance, mechanical properties, and heat resistance. Further, each of the molded articles of Examples 101 to 108 was found to be excellent in adhesion strength to a metal layer.

Example 201

The polyamide (PA1) and a polytetrafluoroethylene resin (PTFE, manufactured by KITAMURA LIMITED, tradename: KTL610), which had been dried under reduced pressure at 150° C. for 7 hours, were blended so as to have a composition shown in Table 3 using a tumbler. The resultant was fed to a base hopper of a twin-screw extruder (manufactured by TOSHIBA MACHINE CO., LTD., tradename: TEM37BS) at a rate of 8 kg/h, and extruded at a cylinder temperature of 280 to 300° C. and a screw rotation speed of 150 rpm, and side-feeding of a glass fiber (manufactured by Nippon Electric Glass Co., Ltd., tradename: 03T-296GH) was carried out at a rate of 2 kg/h, to thereby prepare resin pellets. The resultant resin pellets were subjected to injection molding using an injection molding machine (manufactured by FANUC CORPORATION, tradename: FANUC i100) at a cylinder temperature of 300° C. and a mold temperature of 120° C., to thereby obtain a test piece for evaluation. For the resultant test piece, physical properties of the molded article were measured. Table 4 shows the results of the evaluation.

Example 202

A test piece for evaluation was obtained in the same manner as in Example 201 except that the polyamide (PA1) was changed to the polyamide (PA2). For the resultant test piece, physical properties of the molded article were measured. Table 4 shows the results of the evaluation.

Example 203

A test piece for evaluation was obtained in the same manner as in Example 201 except that the polyamide (PA1) was changed to the polyamide (PA3). For the resultant test piece, physical properties of the molded article were measured. Table 4 shows the results of the evaluation.

Example 204

A test piece for evaluation was obtained in the same manner as in Example 201 except that the glass fiber was changed to a PAN-based chopped carbon fiber. For the resultant test piece, physical properties of the molded article were measured. Table 4 shows the results of the evaluation.

Example 205

A test piece for evaluation was obtained in the same manner as in Example 201 except that the polytetrafluoroethylene resin (manufactured by KITAMURA LIMITED, tradename: KTL610) was changed to graphite (natural scale-like graphite) (manufactured by Nippon Graphite Industries, ltd., tradename: Special CP). For the resultant test piece, physical properties of the molded article were measured. Table 4 shows the results of the evaluation.

Example 206

A test piece for evaluation was obtained in the same manner as in Example 205 except that the amount of the glass fiber blended was changed from 33 parts by mass to 5 parts by mass, and the amount of the carbon fiber blended was changed from 33 parts by mass to 5 parts by mass. For the resultant test piece, physical properties of the molded article were measured. Table 4 shows the results of the evaluation.

Example 207

A test piece for evaluation was obtained in the same manner as in Example 206 was repeated except that the amount of the glass fiber blended was changed from 5 parts by mass to 180 parts by mass, and the amount of the carbon fiber blended was changed from 5 parts by mass to 20 parts by mass. For the resultant test piece, physical properties of the molded article were measured. Table 4 shows the results of the evaluation.

Comparative Example 201

A polyamide 6T (manufactured by Solvay, tradename: Amodel) and a polytetrafluoroethylene resin (manufactured by KITAMURA LIMITED, tradename: KTL610) were blended so as to have a composition shown in Table 4 using a tumbler. The resultant was fed to a base hopper of a twin-screw extruder (manufactured by TOSHIBA MACHINE CO., LTD., tradename: TEM37BS) at a rate of 8 kg/h, and extruded at a cylinder temperature of 300 to 340° C. and a screw rotation speed of 150 rpm, and side-feeding of a glass fiber (manufactured by Nippon Electric Glass Co., Ltd., tradename: 03T-296 GH) was carried out at a rate of 2 kg/h, to thereby prepare resin pellets. The resultant resin pellets were subjected to injection molding using an injection molding machine (manufactured by FANUC CORPORATION, tradename: FANUC i100) at a cylinder temperature of 340° C. and a mold temperature of 130° C., to thereby obtain a test piece for evaluation. For the resultant test piece, physical properties of the molded article were measured. Table 4 shows the results of the evaluation.

Comparative Example 202

A polyamide 46 (manufactured by DSM, tradename: Stanyl) and a polytetrafluoroethylene resin (manufactured by KITAMURA LIMITED, tradename: KTL610) were blended so as to have a composition shown in Table 4 using a tumbler. The resultant was fed to a base hopper of a twin-screw extruder (manufactured by TOSHIBA MACHINE CO., LTD., tradename: TEM37BS) at a rate of 8 kg/h, and extruded at a cylinder temperature of 290 to 310° C. and a screw rotation speed of 150 rpm, and side-feeding of a glass fiber (manufactured by Nippon Electric Glass Co., Ltd., tradename: 03T-296 GH) was carried out at a rate of 2 kg/h, to thereby prepare resin pellets. The resultant resin pellets were subjected to injection molding using an injection molding machine (manufactured by FANUC CORPORATION, tradename: FANUC i100) at a cylinder temperature of 310° C. and a mold temperature of 120° C., to thereby obtain a test piece for evaluation. For the resultant test piece, physical properties of the molded article were measured. Table 4 shows the results of the evaluation.

TABLE 4

| | | Example 201 | Example 202 | Example 203 | Example 204 | Example 205 | Example 206 | Example 207 |
|---|---|---|---|---|---|---|---|---|
| Polyamide (A) | | PA1 | PA2 | PA3 | PA1 | PA1 | PA1 | PA1 |
| (parts by mass) | | 100 | 100 | 100 | 100 | 100 | 100 | 100 |
| Fibrous filler (B2) | Glass fiber | 33 | 33 | 33 | — | 33 | 5 | 180 |
| (parts by mass) | Carbon fiber | — | — | — | 33 | — | — | — |
| Solid lubricant (C) | PTFE | 33 | 33 | 33 | 33 | — | — | — |
| (parts by mass) | Graphite | — | — | — | — | 33 | 5 | 20 |
| Physical properties of molded article | | | | | | | | |
| Tensile strength (MPa) | | 140 | 138 | 135 | 262 | 136 | 95 | 282 |
| Tensile elastic modulus (GPa) | | 9.2 | 8.4 | 8.9 | 16.3 | 8.9 | 4.8 | 24.2 |
| Bending strength (MPa) | | 240 | 228 | 220 | 322 | 225 | 142 | 430 |
| Bending elastic modulus (GPa) | | 8.9 | 8.6 | 8.7 | 19.6 | 8.6 | 3.2 | 19.6 |
| Charpy impact strength (kJ/m$^2$) | | 52 | 48 | 54 | 42.3 | 45 | 58 | 21 |
| Deflection temperature under load (° C.) | | 243 | 240 | 236 | 242 | 243 | 135 | 279 |
| Equilibrium water absorption (% by mass) | | 1.9 | 1.8 | 1.8 | 1.7 | 1.8 | 2.5 | 0.9 |
| Sliding property (comparative abrasion quantity) | | 0.1 | 0.2 | 0.2 | 0.1 | 0.2 | 0.4 | 0.1 |

TABLE 4-continued

|  |  | Comparative Example 201 | Comparative Example 202 |
|---|---|---|---|
| Polyamide (A) |  | PA6T[1)] | PA46[2)] |
| (parts by mass) |  | 100 | 100 |
| Filler (B) | Glass fiber | 33 | 33 |
| (parts by mass) | Carbon fiber | — | — |
| Solid lubricant (C) | PTFE | 33 | 33 |
| (parts by mass) | Graphite | — | — |
| Physical properties of molded article | | | |
| Tensile strength (MPa) |  | 96 | 101 |
| Tensile elastic modulus (GPa) |  | 8.3 | 7.9 |
| Bending strength (MPa) |  | 180 | 165 |
| Bending elastic modulus (GPa) |  | 12.8 | 9.2 |
| Charpy impact strength (kJ/m$^2$) |  | 21.6 | 28.2 |
| Deflection temperature under load (° C.) |  | 239 | 258 |
| Equilibrium water absorption (% by mass) |  | 4.1 | 4.4 |
| Sliding property (comparative abrasion quantity) |  | 1.8 | 2.3 |

[1)]PA6T: manufactured by Solvay, tradename: Amodel
[2)]PA46: manufactured by DSM, tradename: Stanyl As clear from Table 4, each of the molded articles of Comparative Examples 201 and 202 using the polyamide 6T or the polyamide 46 was found to have a large comparative abrasion quantity, low sliding property, low tensile strength, and high equilibrium water absorption.

On the other hand, each of the molded articles of Examples 201 to 207 was found to have excellent sliding property, low water absorption, and excellent mechanical properties.

INDUSTRIAL APPLICABILITY

The polyamide resin composition of the present invention is excellent in heat resistance, has low water absorbability which affects dimensional stability and excellent physical properties such as mechanical properties, has a satisfactory color tone, and contains little gel. Therefore, the polyamide resin composition of the present invention can be suitably used for a variety of applications such as transporting equipment parts such as automotive parts, electrical and electronic parts, and machine parts. The composition is excellent also in sliding property and can be suitably used as a sliding part.

The invention claimed is:

1. A molded article, comprising:
a polyamide (A) comprising a diamine unit including 90 mol % or more of a p-xylylenediamine unit and a dicarboxylic acid unit including 90 mol % or more of a sebacic acid unit and/or an azelaic acid unit;
a fibrous filler (B1) comprising at least one selected from the group consisting of a glass fiber and a carbon fiber and included in an amount of from 5 to 200 parts by mass with respect to 100 parts by mass of the polyamide (A); and
a solid lubricant (C) comprising at least one of a fluorine-based resin and graphite and included in an amount of 5 to 50 parts by mass with respect to 100 parts by mass of the polyamide (A),
wherein the polyamide (A) has a phosphorus atom concentration of 50 to 1,000 ppm and a YI value of 10 or less in a color difference test in accordance with JIS-K-7105,
the polyamide (A) has a number average molecular weight Mn within a range of from 14,000 to 30,000 in gel permeation chromatography, and a dispersivity Mw/Mn within a range of from 1.5 to 5.0,
the molded article has a tensile strength of from 135 MPa to 282 MPa, measured according to test method ISO527 with ISO3167 test piece dimensions, and
the molded article is an automotive part, an electrical part, an electronic part, or a sliding part.

2. The molded article according to claim 1, wherein the dicarboxylic acid unit is the sebacic acid unit.

3. The molded article according to claim 1, wherein the dicarboxylic acid unit is the azelaic acid unit.

4. The molded article according to claim 1, wherein the polyamide (A) has a relative viscosity in a range of from 1.8 to 4.2.

5. The molded article according to claim 1, wherein the fibrous filler (B1) is the glass fiber.

6. The molded article according to claim 1, wherein the fibrous filler (B1) is the glass fiber or the carbon fiber included in an amount of from 5 to 180 parts by mass with respect to 100 parts by mass of the polyamide (A).

7. The molded article according to claim 6, wherein the solid lubricant (C) is polytetrafluoroethylene or graphite included in an amount of from 5 to 33 parts by mass with respect to 100 parts by mass of the polyamide (A).

8. The molded article according to claim 7, wherein the solid lubricant (C) is graphite.

9. The molded article according to claim 7, wherein the solid lubricant (C) is polytetrafluoroethylene.

10. The molded article according to claim 1, wherein the polyamide (A) has the dispersivity Mw/Mn in a range of from 2.5 to 2.7.

11. The molded article according to claim 1, wherein the polyamide (A) includes 10 mol % or less of an m-xylylenediamine unit.

12. The molded article according to claim 11, wherein the m-xylylenediamine unit is present in the polyamide (A).

13. The molded article according to claim 11, wherein the dicarboxylic acid unit is the sebacic acid unit or the azelaic acid unit.

14. The molded article according to claim 5, wherein the fibrous filler (B1) is included in an amount of from 5 to 180 parts by mass with respect to 100 parts by mass of the polyamide (A).

15. The molded article according to claim 6, wherein the fibrous filler (B1) is included in an amount of from 10 to 150 parts by mass with respect to 100 parts by mass of the polyamide (A).

16. The molded article according to claim 6, wherein the fibrous filler (B1) is included in an amount of from 33 to 180 parts by mass with respect to 100 parts by mass of the polyamide (A).

17. The molded article according to claim 1, wherein the solid lubricant (C) is included in an amount of 10 to 40 parts by mass with respect to 100 parts by mass of the polyamide (A).

18. The molded article according to claim 16, wherein the solid lubricant (C) is included in an amount of 20 to 33 parts by mass with respect to 100 parts by mass of the polyamide (A).

19. The molded article according to claim 18, wherein the polyamide (A) has the phosphorus atom concentration of 300 to 315 ppm.

20. The molded article according to claim 18, wherein the polyamide (A) has the phosphorus atom concentration of 300 to 315 ppm, which is derived from at least one phosphorus-atom containing compound selected from the group consisting of calcium hypophosphite, calcium phosphite, and calcium dihydrogen phosphate.

21. The molded article according to claim 1, wherein the molded article has a bending strength (MPa) of from 220 MPa to 430 MPa, measured according to test method ISO178 with test piece dimensions of 80×10×4 mm.

\* \* \* \* \*